United States Patent [19]

Tsujimoto

[11] Patent Number: 5,379,046

[45] Date of Patent: Jan. 3, 1995

[54] INTERFERENCE WAVE CANCELLER

[75] Inventor: Ichiro Tsujimoto, Tokyo, Japan

[73] Assignee: NEC Corporation, Tokyo, Japan

[21] Appl. No.: 73,796

[22] Filed: Jun. 8, 1993

[30] Foreign Application Priority Data

Jun. 9, 1992 [JP] Japan .................. 4-149038
Jul. 8, 1992 [JP] Japan .................. 4-180202

[51] Int. Cl.$^6$ .................. G01S 3/16; H04B 1/00; H04B 1/10
[52] U.S. Cl. .................. 342/378; 455/65; 455/278.1; 455/303
[58] Field of Search .................. 342/378-384; 455/296, 303, 304, 305, 63, 67.3, 52.3, 50.1, 65, 278.1, 276.1

[56] References Cited

U.S. PATENT DOCUMENTS 3,681,695 8/1972 Cease et al. .................. 455/276.1
4,752,969 6/1988 Rilling .................. 455/278

OTHER PUBLICATIONS

R. T. Compton Jr., "The Power-Inversion Adaptive Array: Concept and Performance", IEEE Transaction on Aerospace and Electronic Systems, vol. AES-15, No. 6, pp. 803-814, Nov. 1979.
K. Pahlavan and J. W. Matthews, "Performance of Adaptive Matched Filter Receivers Over Fading Multipath Channels", IEEE Transaction on Communications, vol. 38, No. 12, pp. 2106-2113, Dec. 1990.

Primary Examiner—Gregory C. Issing
Attorney, Agent, or Firm—Ostrolenk, Faber, Gerb & Soffen

[57] ABSTRACT

An interference wave removing apparatus removing interference wave between angle diversity branches is disclosed. This apparatus is suitable for microwave communication beyond line-of-sight. The apparatus comprises a first reception unit for main beam, a second reception unit for angle beam, a first correlator for generating a first correlation signal corresponding to the first reception unit, a second correlator for generating a second correlation signal corresponding to the second reception unit, a first multiplier for multiplying an output of the first reception unit and the first correlation signal, a second multiplier for multiplying an output of the second reception unit and the second correlation signal, a subtractor for subtracting an output of the first multiplier from an output of the second multiplier, a channel quality compensator for compensating for an output of the subtractor for the channel quality, and a delay element for delaying an output of the channel quality compensator. The second reception unit can be adjusted a directivity for the angle beam and is controlled to follow up the angle beam in response to an output of the delay element.

18 Claims, 10 Drawing Sheets

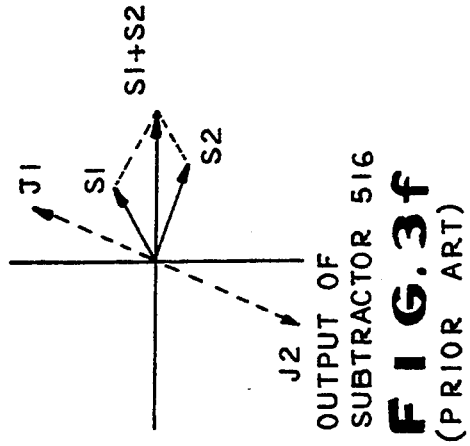
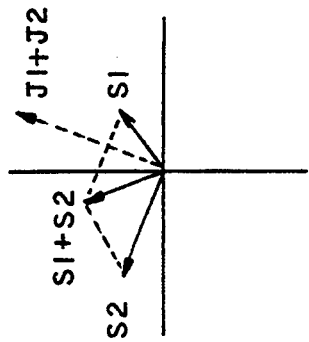
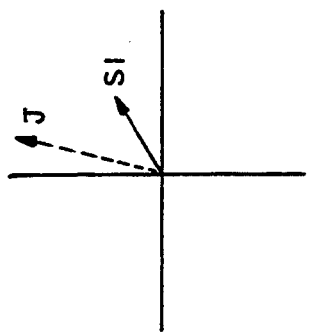
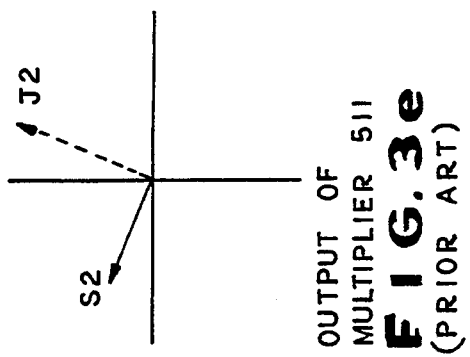
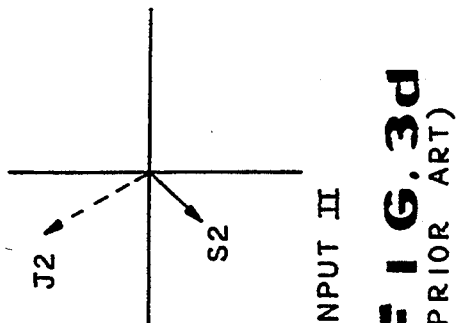

OUTPUT OF ADDER 515

OUTPUT OF MULTIPLIER 510

INPUT I

OUTPUT OF SUBTRACTOR 516

OUTPUT OF MULTIPLIER 511

INPUT II (a) DESIRED WAVE S1 AT OUTPUT OF MULTIPLIER 110
(b) DESIRED WAVE S2 AT OUTPUT OF MULTIPLIER 111
(c) INTERFERENCE WAVE J1 AT OUTPUT OF MULTIPLIER 110
(d) INTERFERENCE WAVE J2 AT OUTPUT OF MULTIPLIER 111

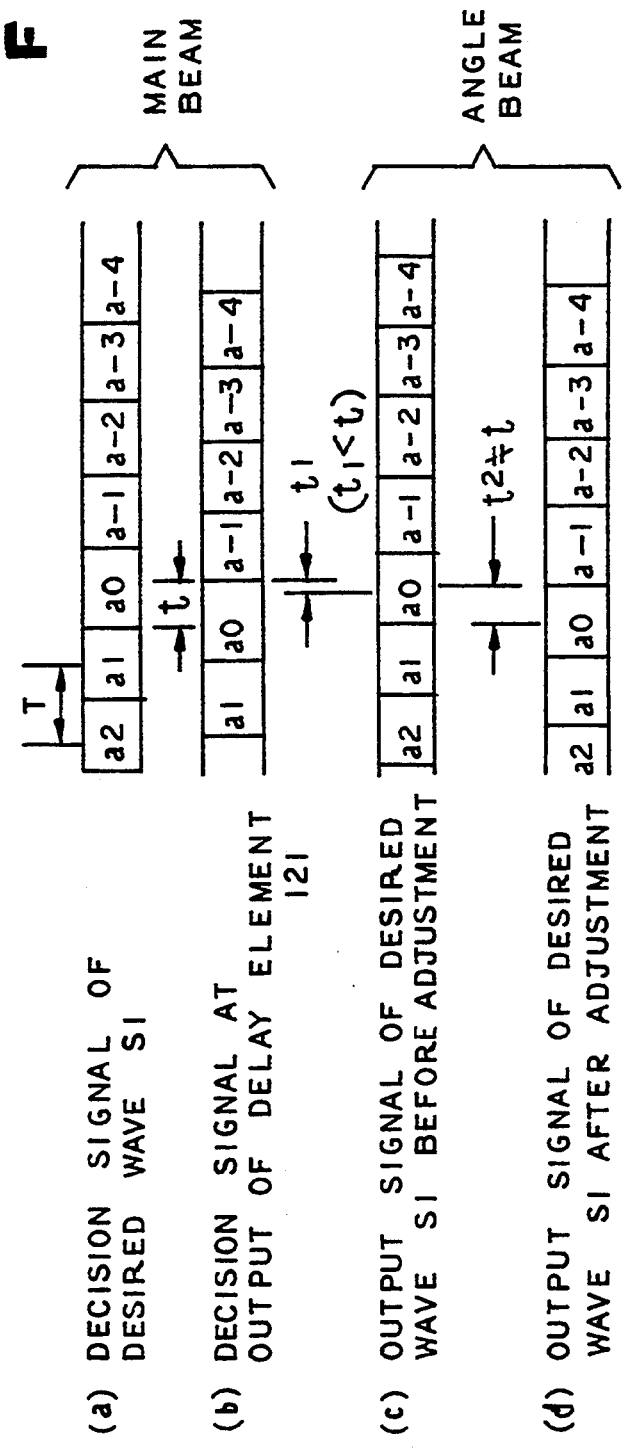
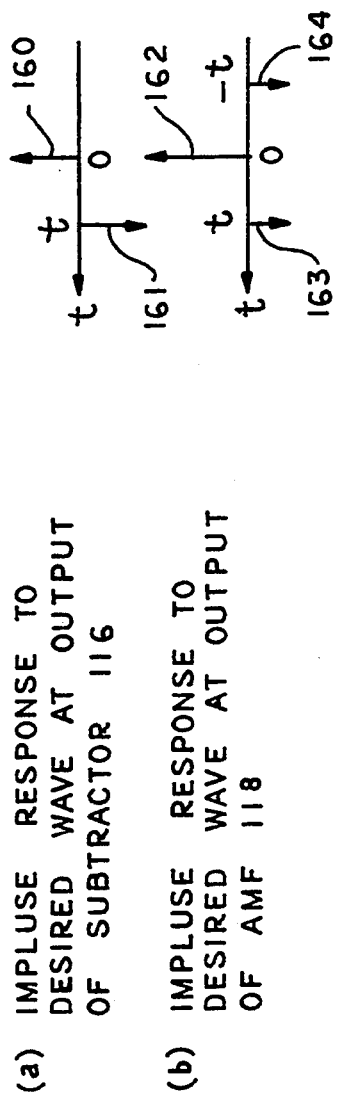

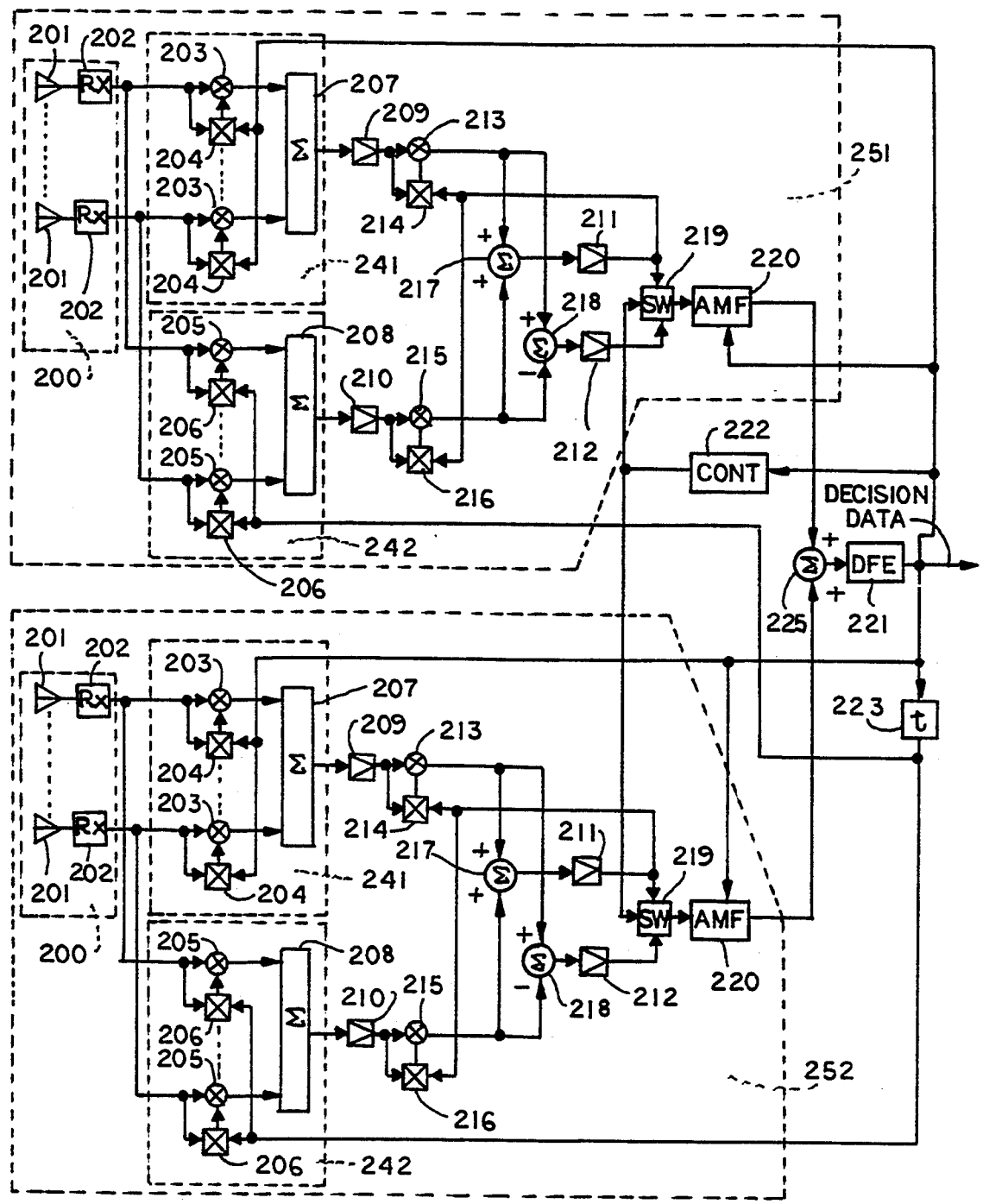
F I G. 11

INTERFERENCE WAVE CANCELLER

BACKGROUND OF THE INVENTION

Field of the Invention

This invention relates to an interference wave removing apparatus, and more particularly to an interference wave removing apparatus which can remove, when a strong interference wave is present in a transhorizon microwave communication channel which employs angle diversity, a wide band interference wave and can adaptively equalize waveform distortion by fading.

Description of the Related Art

Microwave transhorizon communication or microwave communication beyond line-of-sight makes use of a scattering phenomenon of microwaves in the troposphere. First, microwave transhorizon communication will be described with reference to FIG. 1.

Transmission point A and reception point B are located on surface 401 of the earth. A microwave radiated from transmission point A propagates in the directions of vectors AC, AL and AU in accordance with the extension of directivity pattern of transmission antenna 403. In troposphere 402, the beams are scattered and partially received by reception antenna 404 at reception point B. In this instance, multi-path propagation along routes ALB, ACB and AUB as shown in FIG. 1 arises from a difference among locations at which the troposcatter takes place. While actually a multi-path wave arising from a very great number of routes is received, here it is modeled into three waves for simplified description. When such impulse signal 405 as shown in FIG. 1A is transmitted at transmission point A, impulse response 406 for the impulse signal at reception point B is delayed and diffused as shown in FIG. 1B. The signals of the routes undergo Rayleigh fading independently of each other, and impulse response 406 fluctuates in time and causes intense frequency selective fading.

In a radio channel which suffers from a high degree of multi-path fading, a diversity system or an adaptive equalization technique is essential, and in a channel having a long propagation distance such as a transhorizon communication, a matched filter (MF) and an equalizer of the decision feedback type (DFE) are developed as an important technique for canceling inter symbol interference.

An angle diversity method is one of diversity techniques which are used for transhorizon communication. Reception based on angle diversity is performed by preparing two reception horns for reception antenna 404 and setting the center axis of the reception pattern of one of the horns to the main beam (vector CB) direction while setting the center axis of the reception pattern of the other horn to the angle beam (vector UB) direction to construct two independent diversity branches. The reception signals from the main beam and the angle beam have no correlation to each other and can be used sufficiently as diversity signals. Further, since the propagation distance of route AUB is longer than that of route ACB, the angle beam reception wave is delayed by time $\tau$ corresponding to a route difference comparing with the main beam reception wave. It is to be noted that the propagation time of the main beam and the propagation time of the angle beam are fluctuated in time by the elevation angle of the reception horn for the angle beam or the propagation condition of the transmission waves.

By the way, in transhorizon communication, a comparatively high transmission power is required but the reception signal level is very low because the propagation distance is long and a scattering phenomenon in the troposphere is utilized. Therefore, an intense interference wave called near-end disturbing wave is liable to exist at the reception point. In some cases, power U of the interference wave becomes higher than power D of a desired wave from the other party, that is, D/U becomes a negative value lower than 0 dB. When such intense interference wave is present, interference by an FM channel, interference from an adjacent channel or an intentional jammer wave sometimes causes trouble with a digital microwave communication channel which employs PSK (phase shift keying) or QAM (quadrature amplitude modulation). In high speed digital transmission, an FM interference wave can be regarded as a narrow band interference wave, but any other interference wave may be a wide band wave.

Conventionally, in order to remove a intense wide band interference wave described above, a power-inversion adaptive array wherein interference waves are combined in the opposite phases to each other between the diversity branches is employed frequently. The technique is described, for example, in R. T. Compton Jr., "The Power-Inversion Adaptive Array: Concept and Performance". IEEE Transaction on Aerospace and Electronic Systems, Vol. AES-15, No. 6, pp. 803–814, November, 1979.

FIG. 2 shows a construction of a conventional reception system for transhorizon communication which employs the power-inversion adaptive array technique. Main beam horn 503 and angle beam horn 502 are provided on reception antenna 501, and receivers 504 and 505 each including a PSK demodulator are connected to horns 502 and 503, respectively. AGC amplifiers 506 and 507 for stabilizing the base band level are provided at the output sides of receivers 504 and 505, respectively.

Multiplier 510 and correlator 512 are provided on the output side of AGC amplifier 506. Multiplier 510 inputs the output of amplifier 506 and the output of correlator 512 and outputs the product of the input signals. Similarly, multiplier 511 and correlator 513 are provided on the output side of the other AGC amplifier 507. Multiplier 511 inputs the output of amplifier 507 and the output of correlator 513 and outputs the product of the input signals.

Adder 515 for calculating the sum of the output of multiplier 510 and the output of multiplier 511 and subtractor 516 for calculating the difference between the output of multiplier 510 and the output of multiplier 511 are provided. AGC amplifier 508 is provided on the output side of adder 515, and AGC amplifier 509 is provided on the output side of subtractor 516. Switching unit 517 for selecting one of the outputs of AGC amplifiers 508 and 509 is provided, and switching unit 517 is controlled by switch controller 522. The output of AGC amplifier 508 is fed back to correlators 512 and 513. Adaptive matched filter (AMF) 518 and equalizer 519 of the decision feedback type are connected in series to the output side of switching unit 517, and the output of decision feedback equalizer 519 is supplied as decision data to the outside. The decision data is supplied also to switch controller 522.

Next, operation of the system will be described. Inputs to horns 502 and 503, that is, diversity inputs, are demodulated by receivers 504 and 505, respectively, and then, level variation components by fading are removed from the diversity inputs by AGC amplifiers 506 and 507, respectively, whereafter the diversity inputs are supplied to multipliers 510 and 511, respectively. Complex tap coefficients are supplied from correlators 512 and 513 to multipliers 510 and 511, respectively, and the input signals are multiplied by the complex tap coefficients by multipliers 510 and 511, respectively. Each tap coefficient is correlation value of each of the outputs of AGC amplifiers 506 and 507 to the output of AGC amplifier 508 after diversity combining. The correlation values are complex conjugate with transfer coefficients of the input signals of multipliers 510 and 511. Consequently, the outputs of multipliers 510 and 511 are same in phase with each other. Further, each of the outputs of multipliers 510 and 511 has an amplitude equal to a square of an input value to it. Accordingly, maximum ratio combining is achieved by combining the output of multiplier 510 with the output of multiplier 511 by means of adder 515.

When no interference wave exists, switching unit 517 is controlled by switch controller 522 to select and output the output of adder 515, that is, the maximum ratio combiner routes of the outputs of AGC amplifiers 508 and 509. When a channel watchman watches the symbol error rate or the signal-to-noise ratio representative of the channel quality and finds out significant deterioration of the symbol error rate caused by intense interference, switch controller 522 will be manually operated to control switching unit 517 to change over the output thereof so as to select subtractor 516 side. Subtractor 516 subtracts the output of multiplier 511 from the output of multiplier 510 to perform opposite phase combining to remove an interference wave. In other words, the output of subtractor 516 is equivalent to the power-inversion adaptive array output.

Next, the principle of removal of an interference wave in the present system will be described with reference to a vector combining diagram of FIG. 3. The input to angle beam horn 502 side is represented by input I, and the input to main beam horn 503 side is represented by input II. Further, desired waves are represented by S1 and S2, and interfere waves are represented by J1 and J2. When input I shown in (a) is inputted to angle beam horn 502 and input II shown in (b) is inputted to main beam horn 503, the outputs of multipliers 510 and 511 are shown in (b) and (e) and the outputs of adder 515 and subtractor 516 are shown in (c) and (f), respectively.

When the interference waves are higher than the desired waves, that is, when the interference waves are so high that D/U is lower than 0 dB, the level of the interference waves is higher than the level of the desired waves at the output of adder 515, and the interference waves are fed back as reference signals to correlators 512 and 513 to combine the interference waves with each other in the same phase relation. In particular, at each of multipliers 510 and 511, the input signal is multiplied by such a weight coefficient as combine the interference waves between the diversity branches at a maximum rate. As a result, as seen from (b) and (e), the interference waves J1 and J2 become equal in amplitude and phase at the outputs of multipliers 510 and 511. In this instance, at adder 515, same phase combination of the interference waves proceeds as seen from (c).

Meanwhile, subtractor 516 performs an operation opposite to maximum ratio combining at adder 515. Since the levels of the interference waves at the inputs of subtractor 516 are individually normalized by AGC amplifiers 506 and 507, opposite phase combining of the interference waves is performed as seen from (f) at subtractor 516 to remove the interference waves. As a result, subtractor 516 extracts only the desired signal waves. However, as regards desired waves S1 and S2, neither maximum ratio combining nor same phase combining is performed. The desired signal waves may be canceled depending upon the relationship in phase between the desired waves S and the interference waves J.

Here, it is assumed that input I and input II have such a relationship in amplitude and phase as shown in (g) and (j) in FIG. 3 wherein the differences of the phases of the interference waves from the desired waves are equal to each other and the amplitudes of them are equal to each other. The outputs of multipliers 510 and 511 then are shown in (h) and (k), respectively, and the output of adder 515 is shown in (i) while the output of subtractor 516 is shown in (l). As seen from those figures, the outputs of multipliers 510 and 511 coincide completely with each other. As a result, adder 515 performs opposite phase combining for both of interference waves I and desired waves S, and adder 516 performs opposite phase combining for both of interference waves I and desired waves S. In other words, while the interference waves are removed, also the desired signal waves disappear simultaneously.

As described above, with the conventional interference wave removing apparatus based on the power-inversion adaptive array system, when it is tried to remove interference waves, since maximum ratio combining or same phase combining of desired waves between the diversity branches is not performed, optimum reception by adaptive equalization and removal of the interference waves in a channel having multi-path fading are not consistent with each other, and in the worst case, the desired signals are canceled.

As an interference wave removing technique other than the power-inversion adaptive array method, a method wherein the null of the antenna pattern, that is, a deep dip in the directivity characteristic, is provided in the direction of an interference wave so as not to receive the interference wave is conventionally employed. The method is sometimes called side lobe cancellor. With this method, when the coming directions of a desired wave and an interference wave coincide with each other, also the desired wave cannot be received.

SUMMARY OF THE INVENTION

It is an object of the present invention to provide an interference wave removing apparatus wherein disappearance of a desired wave involved in removal of an interference wave can be prevented and removal an intense wide band interference wave and effective removal of multi-path distortion can be achieved without deterioration of the diversity effect.

The object of the present invention described above is achieved by an interference wave removing apparatus for removing an interference wave between angle diversity branches, which comprises first reception means corresponding to a first beam of the angle diversity branches, second reception means corresponding to a second beam of the diversity branches and capable of varying a directivity characteristic thereof with regard to the second beam, first correlation signal generation means for generating a first correlation signal corresponding to the first reception means, second correlation signal generation means for generating a second correlation signal corresponding to the second reception means, a first multiplier for multiplying an output of the first reception means and the first correlation signal, a second multiplier for multiplying an output of the second reception means and the second correlation signal, opposite phase combining means for combining an output of the first multiplier and an output of the second multiplier and outputting a result of the combining, channel quality compensation means for compensating for the result of the combining for the channel quality, and delay means for delaying the output of the channel quality compensation means, the directivity characteristic of the second reception means being varied in response to an output of the delay means.

The above and other objects, features and advantages of the present invention will be apparent from the following description referring to the accompanying drawings which illustrate an example of preferred embodiments of the present invention.

BRIEF DESCRIPTION OF THE DRAWINGS

FIG. 6 is a timing chart illustrating a relative delay time difference in the system of FIG. 4;

FIG. 7 is a timing chart illustrating an impulse response in the system of FIG. 4;

FIG. 11 is a block diagram showing the construction of an interference wave removing system of a fourth embodiment of the present invention.

DESCRIPTION OF THE PREFERRED EMBODIMENTS

In the following, preferred embodiments of the present invention will be described with reference to the drawings. First, an interference wave removing system of the first embodiment of the present invention will be described.

Figure 4:
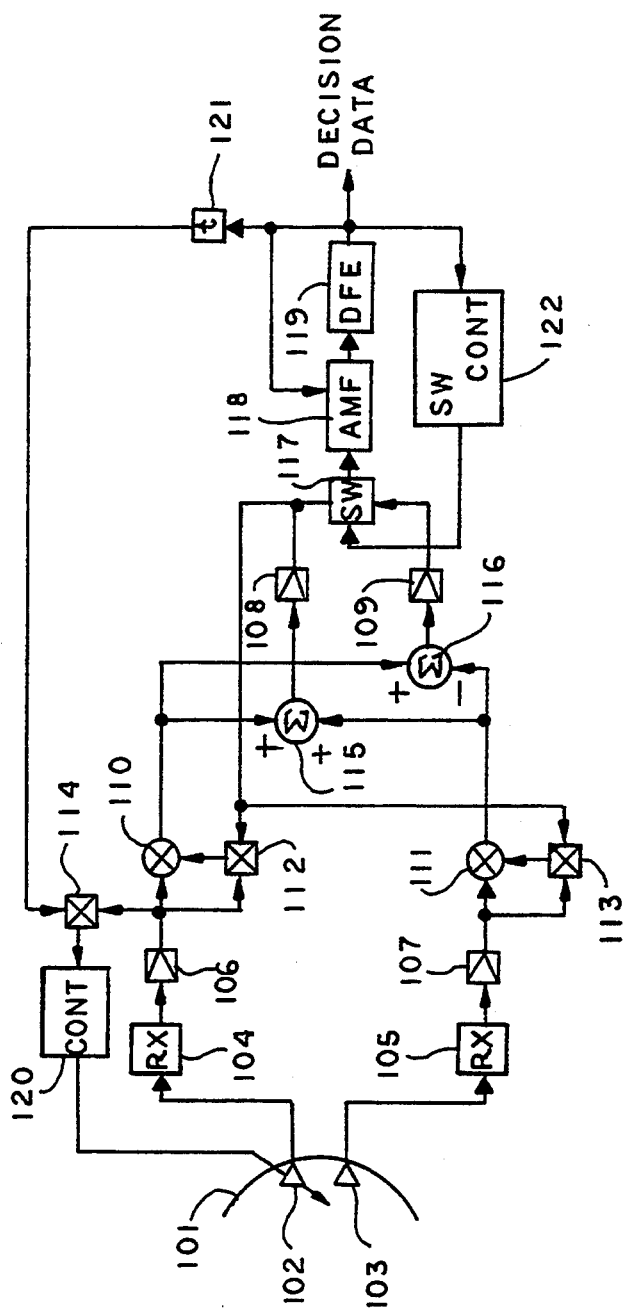
FIG. 4 is a block diagram showing the construction of an interference wave removing system of a first embodiment of the present invention.

The construction of the interference wave removing system of the first embodiment is shown in FIG. 4. The system is used with a receiving station of transhorizon communication by microwaves.

Main beam horn 103 and angle beam horn 102 are provided on antenna 101 for reception. Main beam horn 103 is directed to the coming direction of a main beam. Angle beam horn 102 is constructed so as to change the elevation angle thereof freely, and in order to control the elevation angle, angle beam horn controller 120 is provided. Receivers 104 and 105 each including a PSK demodulator are connected to horns 102 and 103, respectively. A pair of AGC amplifiers 106 and 107 for stabilizing the base band level are provided on the output sides of receivers 104 and 105, respectively.

Multiplier 110 and a pair of correlators 112 and 114 are provided on the output side of AGC amplifier 106. Multiplier 110 inputs the output of AGC amplifier 106 and the output of correlator 112 and outputs the product of the input signals. Correlator 112 calculates the correlation value between the output of AGC amplifier 106 and the output of AGC amplifier 108, which will be hereinafter described, and outputs the correlation value as a complex tap coefficient. Accordingly, the correlation value is complex conjugate with the transfer coefficient of the input signal of multiplier 110. Correlator 114 calculates the correlation value between the output of AGC amplifier 106 and the output of delay element 121, which will be hereinafter described, and outputs the thus calculated correlation value to angle beam horn controller 120. Angle beam horn controller 120 controls angle beam horn 102 to maximize a median of values which are acquired by averaging the correlation values inputted.

Multiplier 111 and correlator 113 are provided on the output side of the other AGC amplifier 107. Multiplier 111 inputs the output of AGC amplifier 107 and the output of correlator 113 and outputs the product of the input signals. Correlator 113 calculates the correlation between the output of AGC amplifier 107 and the output of AGC amplifier 108, which will be hereinafter described, and outputs the correlation value as a complex tap coefficient. The correlation value is complex conjugate with the transfer coefficient of the input signal of multiplier 111.

Adder 115 for calculating the sum of the output of multiplier 110 and the output of multiplier 111 and subtractor 116 for calculating the difference between the output of multiplier 110 and the output of multiplier 111 are provided. AGC amplifier 108 is provided on the output side of adder 115, and AGC amplifier 109 is provided on the output side of subtractor 116. Switching unit 117 for selecting one of the outputs of AGC amplifiers 108 and 109 is provided. The output of AGC amplifier 108 is fed back to correlators 112 and 113. Adaptive matched filter 118 and equalizer 119 of the decision feedback type are connected in series to the output side of switching unit 117. Further, delay element 121 for delaying the output of decision feedback equalizer 119 by time $\tau$ is provided. As described above, the output of delay element 121 is fed back to correlator 114. The output of decision feedback equalizer 119 is supplied as decision data to the outside and also to adaptive matched filter 118 and switch controller 122.

Here, before operation of the system is described, a result of an investigation of the difference in time between reception by the main beam horn and reception of the angle beam horn will be described.

Figure 5:
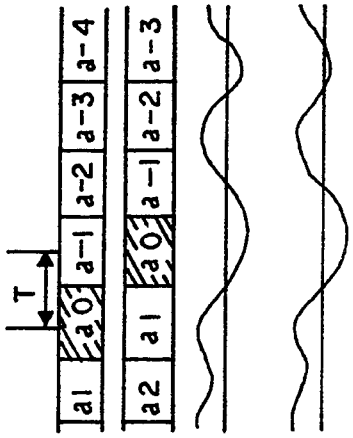
FIG. 5 is a timing chart illustrating a time difference upon reception between a main beam horn and an angle beam horn.

The above description based on the vectors shown in FIG. 3 applies to any case wherein the difference in propagation time between the main beam and the angle beam can be ignored. Actually, however, the propagation time difference may not sometimes be ignored particularly with regard to desired wave S. In particular, since desired wave S is received with a time difference at the main beam horn and the angle beam horn, a displacement in correlation in time is produced between the main beam and the angle beam. FIG. 5 is a timing chart illustrating the displacement. Here, description is given taking as an example the case wherein symbols $a_2$, $a_1$, $a_0$, ... $a_{-3}$, $a_{-4}$, ... (each symbol corresponds to 2 bits in the case of four-phase PSK) of a digital reception signal are disposed in a time sequence and the period of each symbol is T.

It is assumed that the signal format corresponding to the angle beam and the signal format corresponding to the main beam are displaced from each other by period T as shown in FIG. 5. If attention is paid, for example, to symbol $a_0$, since it is displaced by period T, there is no correlation between the main beam and the angle beam with regard to the desired wave. If the time difference between the main beam and the angle beam decreases below one half the period T, then the correlation, for example, between corresponding symbols, that is, between symbols $a_0$ or between symbols $a_1$, becomes high. If opposite phase combining is performed in this condition, then interference between the desired waves occurs as shown in (f) and (1) of FIG. 3, and in the worst case, cancellation of symbols of the desired wave occurs. Accordingly, when there is a propagation time difference greater than a particular value between the main beam and the angle beam so that the correlation between a symbol by the main beam and a corresponding symbol by the angle beam is lost, no cancellation of the desired wave will occur. The present invention has been made in view of this matter. It is to be noted that, since an interference wave is a near-end disturbing wave, no time displacement occurs between the angle beam and the main beam as seen from FIG. 5. Cancellation of an object interference wave is performed regularly by opposite phase combining.

Next, operation of the system of the present embodiment will be described. Reception signals from angle beam horn 102 and main beam horn 103 are converted from radio frequency signals into intermediate frequency signals or base band signals by receivers 104 and 105, respectively, and then, level variation components by fading are removed from the signals to normalize the levels by AGC amplifiers 106 and 107, respectively. The outputs of AGC amplifiers 106 and 107 are supplied to multipliers 110 and 111, in which they are multiplied by complex tap coefficients from correlators 112 and 113, respectively. Since the complex tap coefficients are complex conjugate with transfer coefficients of the input signals of multipliers 110 and 111, the outputs of multipliers 110 and 111 are same in phase with each other and each of the outputs of multipliers 110 and 111 has an amplitude equal to a square of an input value to it. The outputs of multipliers 110 and 111 are combined by same phase combination by adder 115 and are simultaneously combined by opposite phase combining by subtractor 116. Accordingly, the output of adder 115 corresponds to the maximum ratio combiner output of the diversity, and the output of subtractor 116 corresponds to the power-inversion adaptive array output.

When no interference wave exists, switch controller 122 controls switching unit 117 to select the output of adder 115 (maximum ratio combiner output). The maximum ratio combining output is inputted by way of adaptive matchied filter 118 to decision feedback equalizer 119, in which waveform distortion by multi-path fading is removed from the maximum ratio combiner output and from which decision data is outputted. On the other hand, when the interference wave becomes high, switching unit 117 is controlled to select the output of subtractor 116. The signal from the subtractor 116 after the interference wave has been removed is inputted by way of adaptive matched filter 120 to decision feedback equalizer 121, in which waveform distortion by multi-path fading is removed from the signal, and then, the signal is outputted as decision data from the decision feedback equalizer 121.

In the present system, the decision data outputted from the decision feedback equalizer 121 is on one hand outputted to switching controller 122 and adaptive matched filter 118 and on the other hand delayed by time $\tau$ by delay element 121 and fed back to correlator 114. Also the output of AGC amplifier 106 on angle beam horn 102 side is inputted to correlator 114, and correlator 114 successively calculates the correlation value between the input values and outputs it to angle beam horn controller 120. Consequently, the elevation angle of angle beam horn 102 is controlled so that the correlation value from correlator 114 may be maximum. Since the diversity output is fed back to correlator 114 by way of delay element 121, control is performed so that the relative delay time difference between the main beam signal and the angle beam signal may be equal to delay time $\tau$ of the delay element 121 after all.

Here, the relative delay time between the main beam signal and the angle beam signal in the present embodiment will be described with reference to FIG. 6. Generally, in transhorizon communication or communication beyond line-of-sight, the delay time difference of the angle beam from the main beam can be maintained fixed by controlling the setting direction of the angle beam horn. In the present system, the decision data outputted from decision feedback equalizer 119 is delayed by $\tau$ in advance by delay element 121, and the correlation of it from the output signal of AGC amplifier 106 on the angle beam side is taken by correlator 114.

Now, the relative delay difference between the decision data signal before delaying and the output signal of AGC amplifier 106 is represented by $\tau_1$. When the direction of angle beam horn 102 approaches the direction of main beam horn 103 so that the delay difference of the desired wave between the diversity branches is smaller than $\tau$ ($\tau_1 < \tau$), the correlation output of correlator 114 is low. On the other hand, when the direction (elevation angle) of angle beam horn 102 is successively varied so that the angle difference between horns 102 and 103 of reception antenna 101 may increase, the delay of the angle beam reception wave from the main beam reception wave successively increases as indicated by $\tau_2$ in FIG. 6. In particular, the output of correlator 114 increases, and when the delay time of the angle beam reception wave is $\tau$, the correlation value of correlator 114 exhibits its maximum value. Since angle beam horn controller 120 automatically controls the direction of angle beam horn 102 so that the output value of correlator 114 may be maximum, the angle beam reception wave can always be delayed by $\tau$ from the main beam reception wave.

By the way, the correlation value of correlator 114 undergoes short-term phase fluctuation by Rayleigh fading. Accordingly, if angle beam horn 102 is controlled directly with the output of correlator 114, then this is equivalent to the fact that angle control of angle beam horn 102 is performed by short-term fading, and consequently, sometimes the correlation value does not correspond to the propagation path length difference between the angle diversity branches. Therefore, the correlation values of the output of correlator are averaged to obtain the median of them, and control is performed so that the median may be maximum.

When delay time $\tau$ is set so as to be equal to period T of a transmission symbol, the desired wave components at the output of multiplier 110 and the output of multiplier 111 correspond to those when $\tau = T$ in FIG. 6. On the other hand, when a wide band interference wave is applied in the proximity of the reception point (near-end disturbing wave), the delay difference of the interference wave between the diversity branches can be ignored as described hereinabove. Since the interference wave components of the output of multiplier 110 and the output of multiplier 111 are controlled so as to be equal in amplitude and phase to each other, they are removed by subtractor 116. As regards the desired wave, a delay time difference exists between the main beam and the angle beam as described above, and a symbol displacement occurs between the diversity branches. Consequently, the correlation between them is lost, and even if the two desired waves are combined by opposite phase combination, the desired wave signal is not canceled. After all, even if interference wave removal by a power-inversion adaptive array is performed between the angle diversity branches, the desired signal wave is not lost, and removal between a wide band interference wave and multi-path distortion can be performed strongly while maintaining the diversity effect.

It is to be noted that, when there is no interference wave and the time difference between the desired waves is $\tau$ due to multi-path fading or a like cause, impulse responses by two-wave propagation is symmetrized with respect to the center provided by a main response by adaptive matched filter 118. In particular, when the impulse responses at the output of subtractor 116 are main response 160 and response 161 dispersed corresponding to the angle beam, main response 162 outputted from filter 118 makes a response as a result of convergence of dispersed energy 161 upon main response 160, and the amplitude level of main response 162 is higher than that of main response 160 at subtractor 116. This is interpreted as a maximization operation of the signal-to-noise ratio by matched filtering. The delayed response represented by dispersed response 161 is dispersed into two delayed and advanced responses 163 and 164 of a low level. Consequently, the burden to the adaptive equalizing operation of decision feedback equalizer 119 is reduced.

Figure 8:
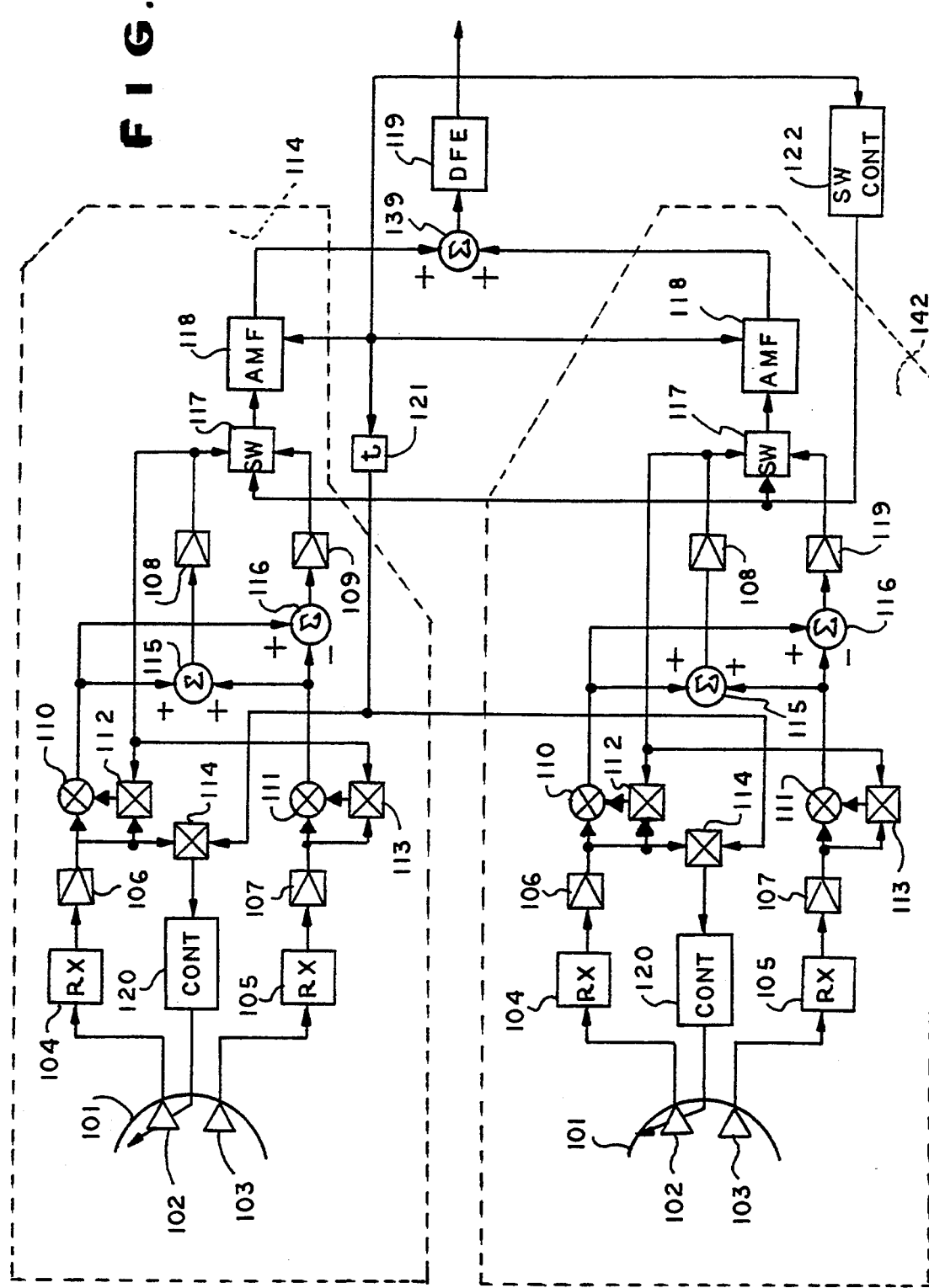
FIG. 8 is a block diagram showing the construction of an interference wave removing system of a second embodiment of the present invention.

Next, a second embodiment of the present invention will be described with reference to FIG. 8. The present embodiment has a construction wherein the system of the first embodiment described above is prepared by two and each angle diversity is used also as spatial diversity, that is, a quadruple diversity construction. Those elements in FIG. 8 to which the same reference characters as those of FIG. 4 are applied have the same functions as those shown in FIG. 4.

The present embodiment has a construction which includes two circuits 141 and 142 each including the elements of the first embodiment from reception antenna 101 to adaptive matched filter 118. In this instance, delay element 121, switching controller 122 and decision feedback equalizer 119 are provided commonly to those circuits 141 and 142. Further, adder 139 is provided for calculating the sum of the outputs of adaptive matched filters 117 of both circuits 141 and 142 and inputting the sum to decision feedback equalizer 119. In particular, decision data, which is the output of decision feedback equalizer 119, is fed back to equalizers 114 of circuits 141 and 142 by way of delay circuit 121. Further, the decision data is inputted to switching controller 122 and also to adaptive matched filters 118 of circuits 141 and 142. The output of switching controller 122 is inputted to switching units 117 of circuits 141 and 142.

In the present system, since spatial diversity reception is performed between circuits 141 and 142 and angle diversity reception by main beam horn 103 and angle beam horn 102 is performed in each of circuits 141 and 142, a total four diversity branch signals which are independent of each other are obtained. Interference wave removal by a power-inversion adaptive array is performed between the angle diversity branches. Then, each of circuits 141 and 142 makes a spatial branch and adaptive diversity combining between the spatial branches is performed by adaptive matched filters 118 of circuits 141 and 142. In those adaptive matched filters 118, implicit diversity combining in a time domain and ordinary spatial diversity combining are performed both by maximum ratio combining. Accordingly, high improvement in signal-to-noise ratio is performed for a desired wave signal, and simultaneously, waveform distortion by multi-path fading is moderated. The waveform distortion is removed finally by decision feedback equalizer 119.

Propagation by the main beam and propagation by the angle beam undergo Rayleigh fading independently of each other. Main response 160 and dispersed response 161 (FIG. 7) undergo level fluctuations and phase fluctuations which have no correlation to each other. Even if the level of main response 160 drops, since a delayed wave of dispersed response 161 can be converted into a main response wave after matched filtering, this can be utilized as a desired wave signal. In other words, the diversity effect in a time domain can be realized by adaptive matched filter 118. This effect is called implicit diversity gain. Accordingly, in the present embodiment, when interference wave removal is to be performed, even if an apparent diversity branch is in a degenerated condition, a diversity gain is maintained as implicit diversity by the delay difference between the angle diversity branches. The diversity effect can be obtained even when no diversity effect can be obtained with a conventional method.

Figure 9:
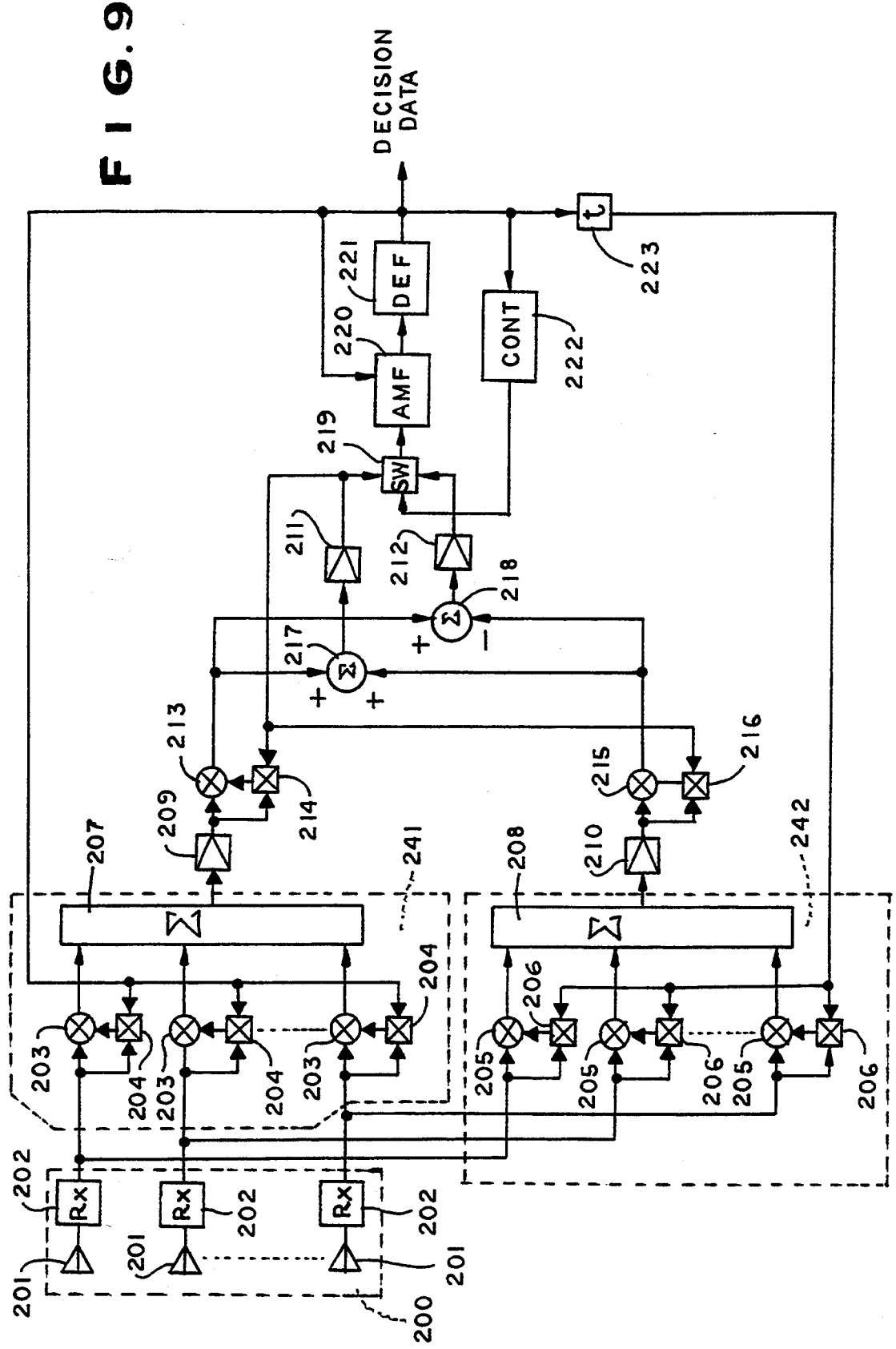
FIG. 9 is a block diagram showing the construction of an interference wave removing system of a third embodiment of the present invention.

Next, a third embodiment of the present invention will be described. While, in the first and second embodiments described above, the elevation angle of the angle beam horn is varied in order to select the direction of the angle beam, in the present embodiment, selection of the angle beam is performed equivalently using an adaptive array antenna. FIG. 9 is a block diagram showing an interference wave removing system of the present embodiment.

Antenna array 200 having N ($N \geq 2$) antennae 201 is provided. Receiver 202 is connected to each antenna 201. The output of each receiver 202 is divided into two branches, and multiplier 203 and correlator 204 are connected to one of the branches while multiplier 205 and correlator 206 are connected to the other branch.

Multiplier 203 and correlator 204 on the one branch side correspond to a main beam while multiplier 205 and correlator 206 on the other branch side correspond to an angle beam. After all, N multipliers 203 and N correlators 204 are provided corresponding to the main beam and N multipliers 205 and N correlators 206 are provided corresponding to the angle beam. Further, combiner 207 for inputting all of the outputs of multipliers 203 corresponding to the main beam and outputting the sum of them and another combiner 208 for inputting all of the outputs of multipliers 205 corresponding to the angle beam and outputting the sum of them are provided. Here, multipliers 203, correlators 204 and combiner 207 collectively construct first adaptive array 241, and the other multipliers 205, correlators 206 and combiner 208 collectively construct second adaptive array 242.

In first adaptive array 241, each of multipliers 203 calculates the product between the output of a corresponding one of receivers 202 and the output of corresponding correlator 204, and each correlator 204 calculates and outputs the correlation value between the output of corresponding receiver 202 and decision data which will be hereinafter described. Similarly, in second adaptive array 242, each multiplier 205 calculates the product between the output of corresponding receiver 202 and the output of corresponding correlator 206, and each correlator 206 calculates and outputs the correlation value between the output of corresponding receiver 202 and the output of delay element 223 which will be hereinafter described.

AGC amplifiers 209 and 210 for stabilizing the base band level are provided on the output sides of combiners 207 and 208, respectively. Multiplier 213 and correlator 214 are provided on the output side of AGC amplifier 209 which corresponds to first adaptive array 241. Multiplier 213 inputs the output of AGC amplifier 209 and the output of correlator 214 and outputs the product of the input signals. Correlator 214 calculates the correlation value between the output of AGC amplifier 209 and the output of another AGC amplifier 211 which will be hereinafter described, and outputs it as a complex tap coefficient. Accordingly, the correlation value is complex conjugate with the transfer coefficient of the input signal of multiplier 213.

Similarly, multiplier 215 and correlator 216 are provided on the output side of AGC amplifier 210 which corresponds to second adaptive array 242. Multiplier 215 inputs the output of AGC amplifier 210 and the output of correlator 216 and outputs the product of the input signals. Correlator 216 calculates the correlation value between the output of AGC amplifier 210 and the output of another AGC amplifier 211 which will be hereinafter described, and outputs it as a complex tap coefficient. The correlation value is complex conjugate with the transfer coefficient of the input signal of multiplier 215.

Adder 217 for calculating the sum between the output of multiplier 213 and the output of multiplier 215 and subtractor 218 for calculating the difference between the output of multiplier 213 and the output of multiplier 215 are provided. AGC amplifier 211 is provided on the output side of adder 217, and the other AGC amplifier 212 is provided on the output side of subtractor 218. Switching unit 219 for selecting either one of AGC amplifiers 211 and 212 and switch controller 222 for controlling switching unit 219 are provided. The output of AGC amplifier 211 is fed back to correlators 214 and 216. Adaptive matched filter 220 and decision feedback equalizer 221 are provided in series to the output side of switching unit 219. Further, delay element 223 for delaying the output of decision feedback equalizer 221 by time $\tau$ is provided. As described above, the output of delay element 223 is fed back to correlators 206 of second adaptive array 241. The output of decision feedback equalizer 221 is supplied as decision data to the outside and also to adaptive matched filter 220 and switch controller 222.

Now, operation of the system will be described.

Reception signals of antennae 201 constituting antenna array 200 are inputted to multipliers 203 and 205 of first and second adaptive arrays 241 and 242 by way of respective receivers 202, and also complex tap coefficients from correlators 204 and 206 are inputted to multipliers 203 and 205, respectively. Consequently, the directivity of each antenna can be changed for each adaptive array 241 and 242. In the present embodiment, adaptive arrays 241 and 242 are controlled so that first adaptive array 241 corresponds to the main beam and the output of it is a main beam reception signal while second adaptive array 242 corresponds to the angle beam and the output of it is an angle beam reception signal.

The outputs of first and second adaptive arrays 241 and 242 are supplied to AGC amplifiers 209 and 210, respectively, in which level variation components of them by fading are removed from them to normalize the levels of them. The outputs of AGC amplifiers 209 and 210 are supplied to multipliers 213 and 214, in which they are multiplied by complex tap coefficients from the correlators 214 and 215, respectively. Since those complex tap coefficients are complex conjugate with transfer coefficients of the input signals of multipliers 213 and 215, the outputs of multipliers 213 and 215 are same in phase and have amplitude values equal to squares to the input values to them. Then, the outputs of multipliers 213 and 215 are combined by same phase combination by adder 217 and simultaneously combined by opposite phase combination by subtractor 218. Accordingly, the output of adder 217 corresponds to a maximum ratio combiner output of the diversity, and the output of subtractor 218 corresponds to a power-inversion adaptive array output.

When no interference wave is present, switch controller 222 controls switching unit 219 to select the output (maximum ratio combiner output) of adder 217. The maximum ratio combiner output is inputted by way of adaptive matched filter 220 to decision feedback equalizer 221, in which waveform distortion by multipath fading is removed from the same, and decision data is outputted from decision feedback equalizer 221. On the other hand, when the interference wave becomes high, switching unit 219 is controlled so as to select the output of subtractor 218. The signal from subtractor 218 after the interference wave has been removed is inputted by way of adaptive matched filter 220 to decision feedback equalizer 221, in which waveform distortion by multi-path fading is removed, and decision data is outputted from decision feedback equalizer 221.

In the present system, the decision data outputted from decision feedback equalizer 221 is outputted to switch controller 222 and adaptive matched filter 220 and is fed back to correlators 204 of first adaptive array 241. Further, the decision data is further delayed by time $\tau$ by delay element 223 and fed back to correlators 206 of second adaptive array 242. Since the decision data is fed back in this manner, first adaptive array 241 follows up the main beam and second adaptive array 242 follows up the angle beam as described below.

Next, operation of adaptive arrays 241 and 242 will be described in detail. The technique of an LMS (least mean square) adaptive array is used frequently for operation of directing the directivity of an antenna to the coming direction of a reception signal by means of an adaptive array. In particular, an error signal between the output of a combiner and a reference signal at each adaptive array is first found out, and then correlation between the error signal and the input to each multiplier is taken to obtain a complex tap coefficient to be multiplied at each multiplier in order to direct the antenna directivity to the reception signal coming direction. In the present embodiment, in order to minimize the scale of the apparatus, correlation processing to decision data outputted from decision feedback equalizer 221 is employed. More particularly, for control of adaptive array 241, correlation between decision data outputted from decision feedback equalizer 221 and the inputs to N multipliers 203 is taken individually, and the correlation values are multiplied by individual multipliers 203. The correlation method is equivalent to an MMSE (minimum mean square error) method based on the LMS algorithm using an error signal described above. The equivalent method is analyzed in K. Pahlavan and J. W. Matthews, "Performance of Adaptive Matched Filter Receivers Over Fading Multipath Channels", IEEE Transaction on Communications, Vol. 38, No. 12, pp. 2106–2113, December, 1990.

Since correlation control is executed by correlators 204 using the decision data as it is, first adaptive array 241 operates so as to follow up the main beam. Meanwhile, second adaptive array 242 must necessarily follow up the angle beam. Since the angle beam reception wave is delayed comparing with the main beam reception wave as described already, it is possible to cause the equivalent antenna directivity of second adaptive array 242 to follow up the beam of the route which delays the beam by time $\tau$ with respect to the main beam by the correlation controlling by means of correlator 206 using the decision data delayed by time $\tau$ by means of delay element 223. In other words, the angle beam delayed by time $\tau$ from the main beam can be caught by second adaptive array 242. By adaptive array control by the correlation method described above, angle diversity reception can be performed while maintaining delay difference $\tau$ between the main beam reception wave and the angle beam reception wave.

Figure 1:
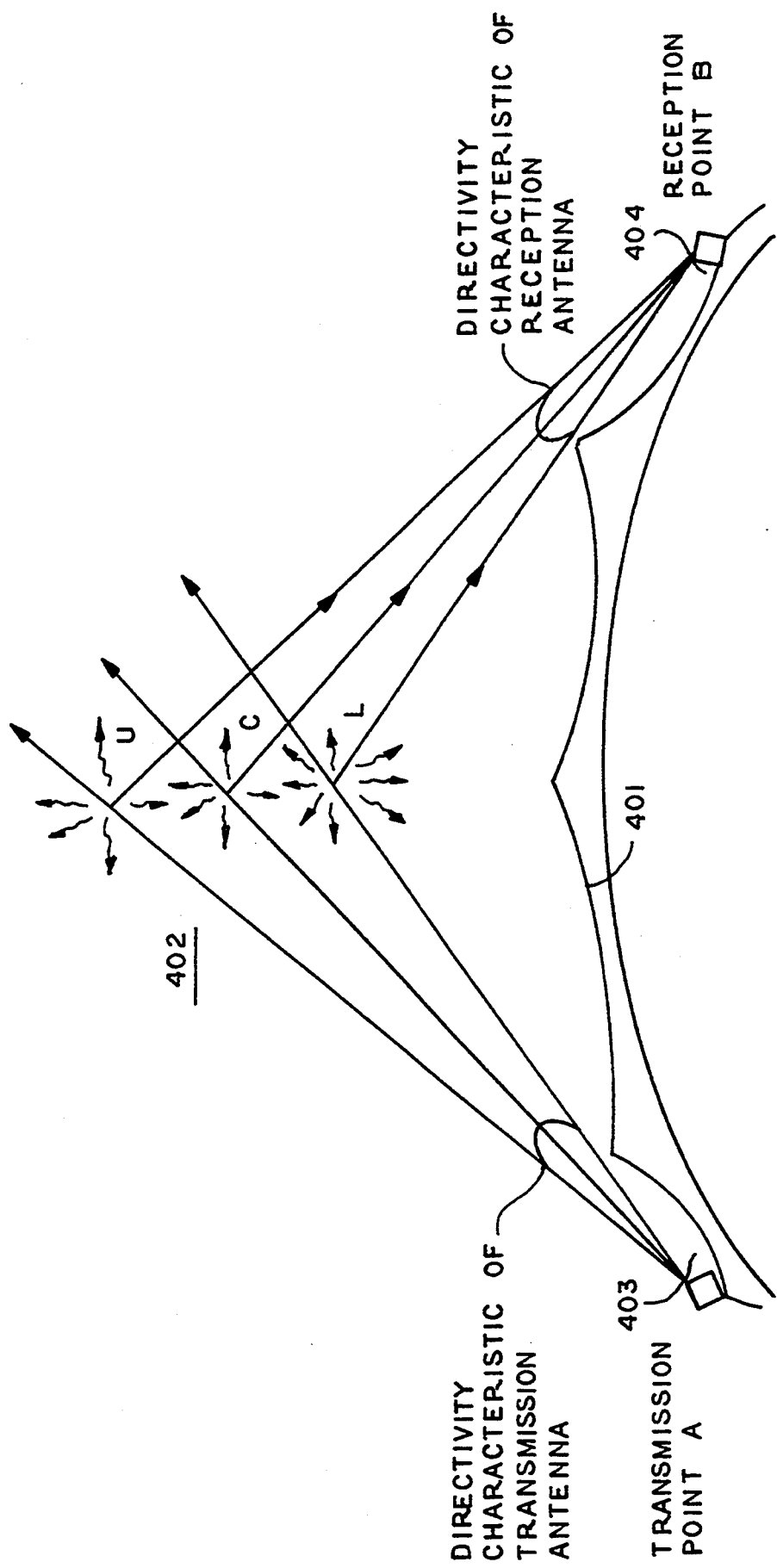
FIG. 1 is a diagrammatic view illustrating microwave transhorizon communication.
Figure 2:
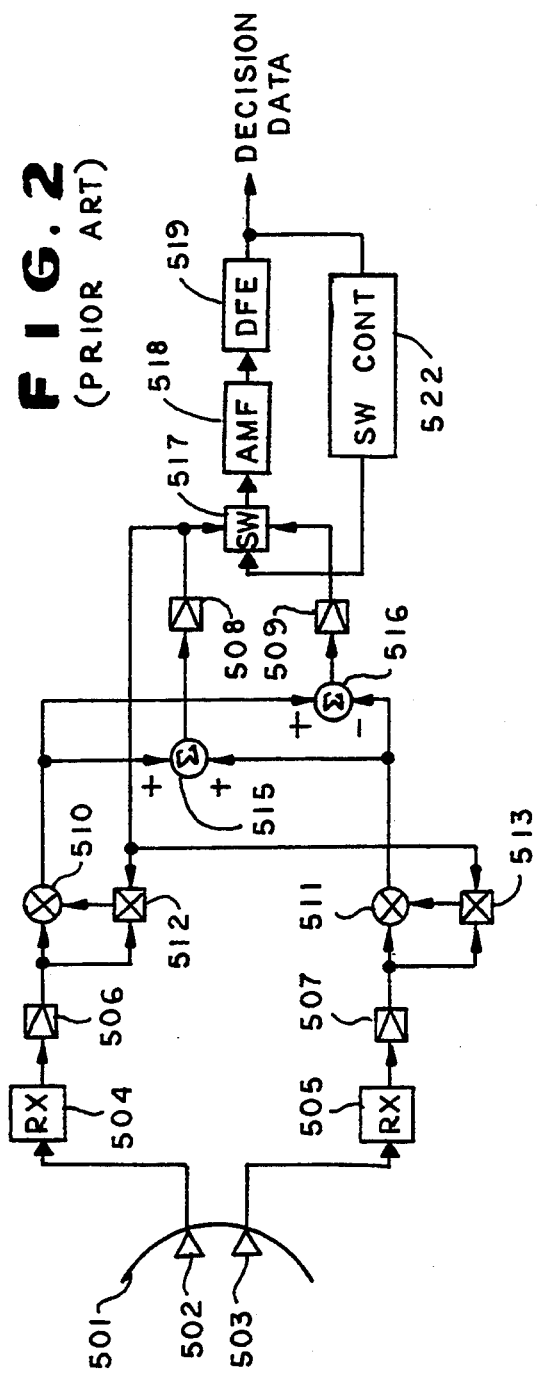
FIG. 2 is a block diagram showing the construction of a conventional reception system for transhorizon communication which employs the power-inversion adaptive array technique.
Figure 1B:
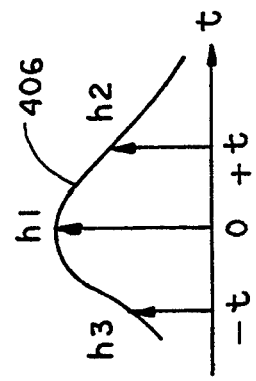
FIG. 1B is a waveform diagram illustrating a response to the transmission impulse of FIG. 1A.
Figure 1A:
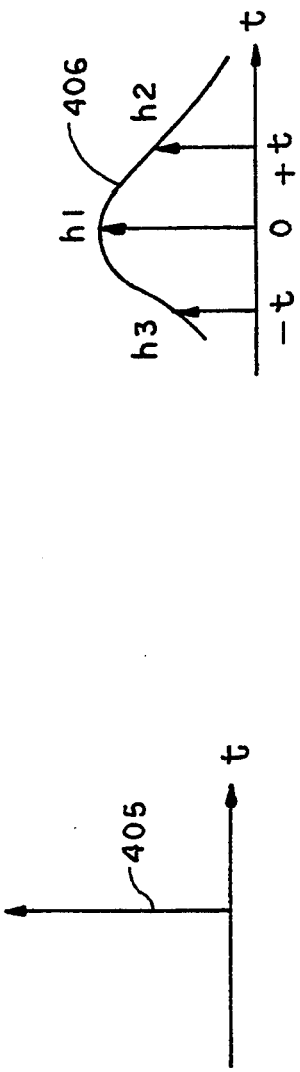
FIG. 1A is a waveform diagram showing an impulse to be transmitted.
Figure 3I:
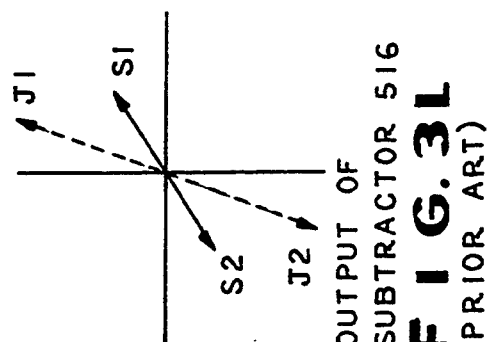
FIG. 3 is a diagram illustrating a relationship between vectors of a desired wave and an interference wave.
Figure 3H:
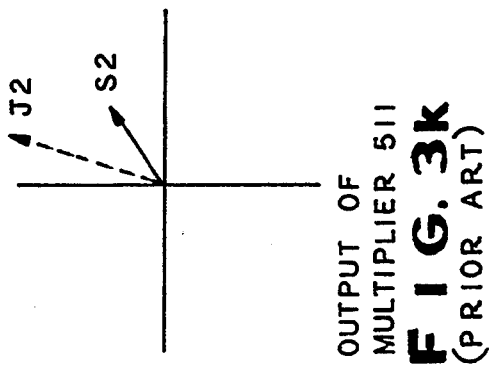
Figure 3G:
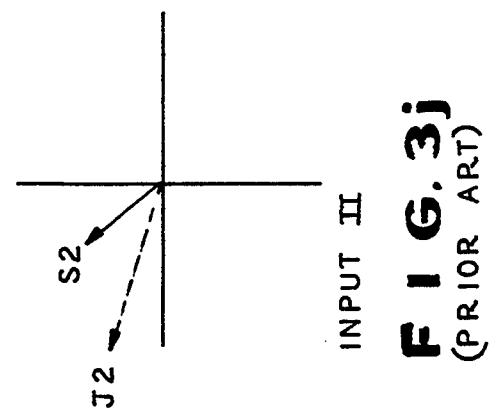
Figure 3L:
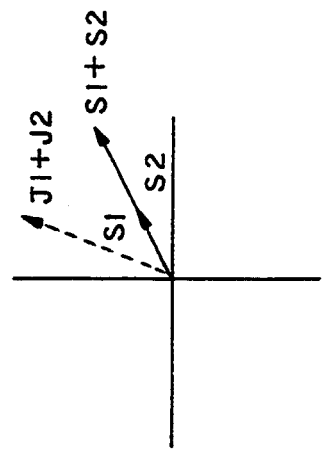
Figure 3K:
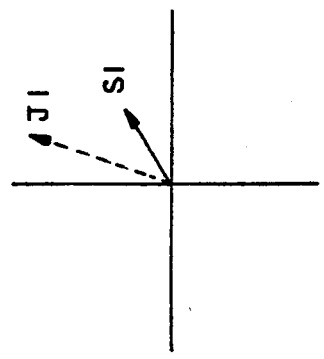
Figure 3J:
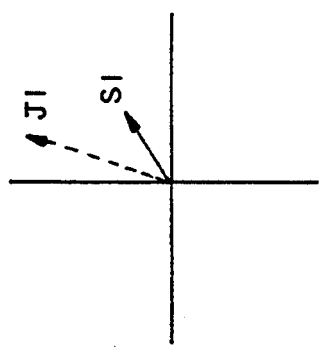
Figure 10:
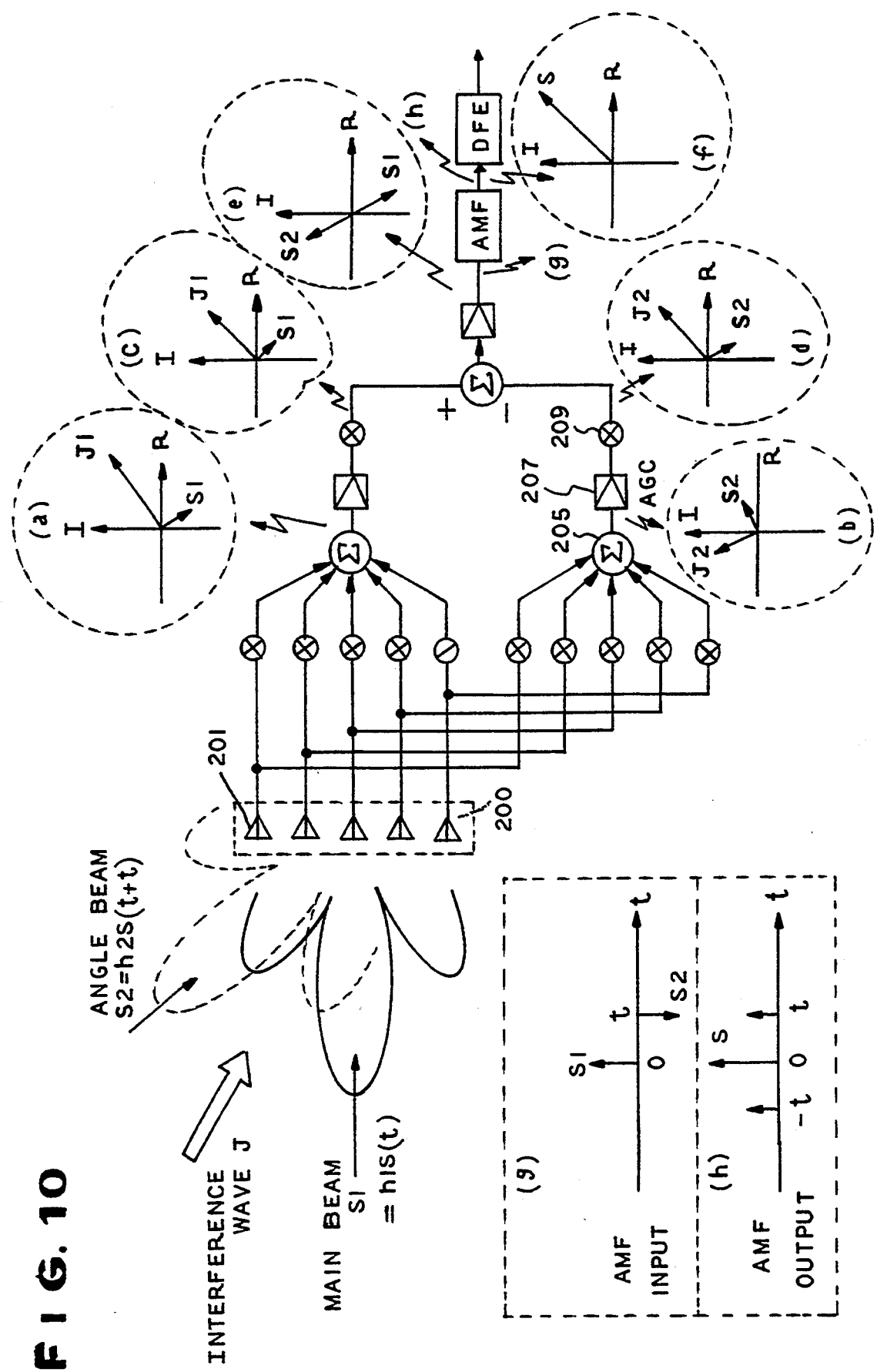
FIG. 10 is a diagrammatic view illustrating operation of the system of FIG. 9.

FIG. 10 is a diagrammatic view illustrating operation of the system of the present embodiment. The output from each of antennae 201 of antenna array 200 is divided into two branches and inputted to multipliers 203 in first adaptive array 241 and multipliers 205 in second adaptive array 242. Equivalent antenna patterns (indicated by solid lines) by first adaptive array 241 are used for reception of the main beam, and equivalent antenna patterns (indicated by broken lines) by second adaptive array 242 are used for reception of the angle beam. Here, in impulse response 406 shown in FIG. 1B, discrete values at $t = -\tau, 0, +\tau$ are represented by $h_3$ $h_1$, $h_2$, respectively, and the transmission signal is represented by $S(t)$. In this instance, main beam desired wave S1 directed in the direction of vector CB in FIG. 1 and angle beam desired wave S2 directed in the direction of vector UB are respectively given by the following equations (1) and (2):

$$S1 = h1 NS(t) \qquad (1)$$

$$S2 = h2 NS(t+\tau) \qquad (2)$$

When interference wave J comes to antenna array 200 as shown in FIG. 10, reception wave R1 by first adaptive array 241 and reception wave R2 by second adaptive array 242 are given by equations (3) and (4), respectively:

$$R1 = S1 + J1 = h1 NS(t) + JNA1 \exp(j\phi_1) \qquad (3)$$

$$R2 = S2 + J2 = h2 NS(t+\tau) + JNA2 \exp(j\tau_2) \qquad (4)$$

Reception signals R1 and R2 are the outputs of combiners 207 and 208, respectively, and can be represented in vector as shown by (a) and (b) in FIG. 10. Here, it is assumed that D/U (ratio of the desired wave to the interference wave) is lower than 0 dB, and as shown by (a) and (b), the interference wave is higher in level than the desired wave. In this instance, AGC amplifiers 209 and 210 operate so as to normalize the interference wave level. In the present embodiment, a power-inversion adaptive array is applied to a set of first and second adaptive arrays 241 and 242, and opposite phase combining of the interference waves is performed by multipliers 213 and 215 and subtractor 218. The signal vector diagrams of the outputs of multipliers 213 and 215 then are shown by (e) and (d), respectively. In particular, the outputs of multipliers 213 and 215 are controlled so as to have a same phase and a same amplitude with regard to the interference wave.

Here, it is assumed that desired waves S1 and S2 are in a same phase. The signal vector after the interference waves are combined by opposite phase combination by subtractor 218 is such as shown by (e). The desired wave is normalized by AGC amplifier 212. When such a desired wave vector relationship as shown by (e) is obtained with an ordinary power-inversion adaptive array, desired waves S1 and S2 will cancel each other to cause the signal to disappear. However, in the present embodiment, propagation delay time difference $\tau$ is present as indicated by equations (3) and (4). In particular, as seen from (g), even when the vector S1 and the vector S2 are opposite in phase, time difference $\tau$ is present between them. As a result, the output of adaptive matched filter 220 is such as seen from (h), and the desired wave does not disappear. The waveform shown by (h) is equivalent to an impulse response to the waveform shown in (g) (input to the adaptive matched filter) by a two-wave multi-path propagation route.

The delay dispersion by the two-wave multi-path propagation is converged to a reference timing by adaptive matched filter 220. As seen from (h), the time difference between desired waves S1 and S2 is eliminated, and maximum ratio combining in a time domain is performed between desired waves S1 and S2 and the signal-to-noise ratio is enhanced. This can be interpreted that the angle diversity is converted into diversity of the time domain and a diversity gain of it is obtained by the matched filter, and the enhanced amount by the effect is called implicit diversity gain. Accordingly, even when diversity is degenerated with the prior art, the diversity effect is maintained with the present embodiment. After the matched filtering, final inter symbol interference is removed by decision feedback equalizer 221. After all, removal of a strong wide band interference wave and multi-path distortion has been performed while maintaining the diversity effect.

In the present embodiment, by using an adaptive array antenna, angle diversity reception which is always good against a long-term fluctuation of propagation such as a seasonal variation. Route AUB and route ACB shown in FIG. 1 undergo a fluctuation of Rayleigh fading for a short term and further fluctuates geometrically for a long term. Consequently, if angle diversity reception is performed with a plurality of fixed reception horns, it sometimes may occur that the reception level at a certain branch is lower than that at another branch and consequently the diversity effect is lowered. In the present embodiment, since the directivity of a reception beam is adjusted adaptively, that is, since the beam forming function by an adaptive array antenna is utilized, a diversity branch signal can always be caught.

Next, a fourth embodiment of the present invention will be described with reference to FIG. 11. The present embodiment has a construction wherein the system of the third embodiment described above is prepared by two and the angle diversity is used also for spatial diversity. that is, a quadruple diversity construction. Those elements in FIG. 11 to which the same reference characters as those of FIG. 9 are applied have the same functions as those shown in FIG. 9.

The present embodiment has a construction which includes two circuits 251 and 252 each including the elements of the third embodiment from antenna array 200 to adaptive matched filter 220. In this instance, delay element 223, switching controller 222 and decision feedback equalizer 221 are provided commonly to those circuits 251 and 252. Further, adder 225 is provided for calculating the sum of the outputs of adaptive matched filters 220 of both circuits 251 and 252 and inputting the sum to decision feedback equalizer 221. In particular, decision data, which is the output of decision feedback equalizer 221, is supplied to adaptive matched filters 220 and switching controller 222 and also to delay circuit 223 and supplied to correlators 204 in first adaptive arrays 241 of circuits 251 and 252. The output of delay element 223 is supplied to correlators 206 in second adaptive array 242 of circuits 251 and 252. The output of switching controller 222 is inputted to switching units 219 of circuits 251 and 252.

In the present system, antenna arrays 200 of circuits 251 and 252 constitute a first spatial diversity branch and a second diversity branch, respectively. The outputs of subtractors 218 of circuits 251 and 252 correspond to the power-inversion adaptive array outputs of the first and second spatial diversity branches, respectively. The spatial diversity signals are combined by adaptive diversity combination by AGC amplifiers 212 and adaptive matched filters 220 for individual circuits 251 and 252. Final diversity combinig is performed by adder 225, and the result of the diversity combing is supplied to decision feedback equalizer 221, in which it undergoes an adaptive equalization operation.

It is to be understood that variations and modifications of the interference wave removing apparatus disclosed herein will be evident to those skilled in the art. It is intended that all such modifications and variations be included within the scope of the appended claims.

What is claimed is:

1. An interference wave removing apparatus for removing an interference wave between angle diversity branches, comprising:

first reception means corresponding to a first beam of said angle diversity branches, second reception means corresponding to a second beam of said diversity branches and capable of varying a directivity characteristic thereof with regard to the second beam, first correlation signal generation means for generating a first correlation signal corresponding to said first reception means, second correlation signal generation means for generating a second correlation signal corresponding to said second reception means, a first multiplier for multiplying an output of said first reception means and the first correlation signal, a second multiplier for multiplying an output of said second reception means and the second correlation signal, opposite phase combing means for combining an output of said first multiplier and an output of said second multiplier and outputting a result of the combing, channel quality compensation means for compensating for the result of the combining for the channel quality, and delay means for delaying the output of said channel quality compensation means, the directivity characteristic of said second reception means being varied in response to an output of said delay means.

2. An interference wave removing apparatus as claimed in claim 1, further comprising same phase combinig means for combining the output of said first multiplier and the output of said second multiplier by same phase combining and outputting a result of the combining, and switching selection means for selecting one of an output of said same phase combining means and the output of said opposite phase combining means and outputting the selected output to said channel quality compensation means.

3. An interference wave removing apparatus as claimed in claim 1, wherein said first reception means includes a main beam horn for receiving the first beam, a first receiver connected to said main beam horn, and a first AGC amplifier for removing a level variation of an output of said first receiver, and said second reception means includes an angle beam horn for receiving the second beam, a second receiver connected to said angle beam horn, a second AGC amplifier for removing a level variation of an output of said second receiver, a correlator for inputting the output of said delay means and an output of said second AGC amplifier, and angle beam horn control means for varying a directivity characteristic of said angle beam horn so that the output of said correlator may be maximum.

4. An interference wave removing apparatus as claimed in claim 3, further comprising same phase combining means for combining the output of said first multiplier and the output of said second multiplier by same phase combining and outputting a result of the combining, and switching selection means for selecting one of an output of said same phase combining means and the output of said opposite phase combining means and outputting the selected output to said channel quality compensation means.

5. An interference wave removing apparatus as claimed in claim 3, wherein said angle beam horn control means varies an elevation angle of said angle beam horn.

6. An interference wave removing apparatus as claimed in claim 3, wherein said channel quality compensation means includes an adaptive matched filter and an equalizer of the decision feedback type.

7. An interference wave removing apparatus as claimed in claim 3, wherein said delay means has a predetermined delay time initially set to a point displaced from another point at which the correlation value of said correlator presents its maximum value.

8. An interference wave removing apparatus as claimed in claim 3, wherein it is adapted to a microwave transhorizon channel.

9. An interference wave removing apparatus as claimed in claim 1, further comprising
an antenna array including N antennae and a receiver provided for each of said antennae, N being equal to or greater than 2, and wherein
said first reception means includes a first adaptive array for inputting an output of said antenna array, and a first AGC amplifier for removing a level variation of an output of said first adaptive array,
said second reception means includes a second adaptive array for inputting the output of said antenna array, and a second AGC amplifier for removing a level variation of an output of said second adaptive array, and
said first adaptive array is controlled in response to the output of said channel quality compensation means, and said second adaptive array is controlled in response to the output of said delay means.

10. An interference wave removing apparatus as claimed in claim 9, further comprising same phase combining means for combining the output of said first multiplier and the output of said second multiplier by same phase combining and outputting a result of the combining, and switching selection means for selecting one of an output of said same phase combining means and the output of said opposite phase combining means and outputting the selected output to said channel quality compensation means.

11. An interference wave removing apparatus as claimed in claim 9, wherein each of said adaptive arrays includes N correlators individually provided for said receivers for calculating and outputting correlations between the outputs of the corresponding receivers and a feedback signal, N multipliers individually provided for said correlators for calculating and outputting products between the outputs of the corresponding receivers and outputs of the corresponding correlators, and a combiner for calculating and outputting a sum of outputs of said N multipliers, and the feedback signal to said first adaptive array is the output of said channel quality compensation means while the feedback signal to said second adaptive array is the output of said delay means.

12. An interference wave removing apparatus as claimed in claim 9, wherein said channel quality compensation means includes an adaptive matched filter and an equalizer of the decision feedback type.

13. An interference wave removing apparatus as claimed in claim 9, wherein it is applied to a microwave transhorizon channel.

14. An interference wave removing apparatus as claimed in claim 1, wherein a plurality of sets each including said first reception means, said second reception means, said first correlation signal generation means, said second correlation signal generation means, said first multiplier, said second multiplier and said opposite phase combining means are provided, and spatial diversity is constituted from said sets.

15. An interference wave removing apparatus as claimed in claim 14, wherein
said first reception means includes a main beam horn for receiving the first beam, a first receiver connected to said main beam horn, and a first AGC amplifier for removing a level variation of an output of said first receiver, and
said second reception means includes an angle beam horn for receiving the second beam, a second receiver connected to said angle beam horn, a second AGC amplifier for removing a level variation of an output of said second receiver, a correlator for inputting the output of said delay means and an output of said second AGC amplifier, and angle beam horn control means for varying a directivity characteristic of said angle beam horn so that an output of said correlator may be maximum.

16. An interference wave removing apparatus as claimed in claim 15, wherein said channel quality compensation means includes an adaptive matched filter and an equalizer of the decision feedback type.

17. An interference wave removing apparatus as claimed in claim 16, further comprising
an antenna array including N antennae and a receiver provided for each of said antennae, N being equal to or greater than 2, and wherein
said first reception means includes a first adaptive array for inputting an output of said antenna array, and a first AGC amplifier for removing a level variation of an output of said first adaptive array,
said second reception means includes a second adaptive array for inputting the output of said antenna array, and a second AGC amplifier for removing a level variation of an output of said second adaptive array, and
said first adaptive array is controlled in response to the output of said channel quality compensation means, and said second adaptive array is controlled in response to the output of said delay means.

18. An interference wave removing apparatus as claimed in claim 17, wherein said channel quality compensation means includes an adaptive matched filter and an equalizer of the decision feedback type.

* * * * *